(12) United States Patent
Tochigi et al.

(10) Patent No.: US 7,570,444 B2
(45) Date of Patent: Aug. 4, 2009

(54) IMAGING OPTICAL SYSTEM AND IMAGE READING APPARATUS USING THE SAME

(75) Inventors: Nobuyuki Tochigi, Utsunomiya (JP); Takeyoshi Saiga, Utsunomiya (JP); Tadao Hayashide, Utsunomiya (JP); Kazuyuki Kondo, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/129,875

(22) Filed: May 30, 2008

(65) Prior Publication Data

US 2008/0239440 A1  Oct. 2, 2008

Related U.S. Application Data

(62) Division of application No. 11/772,457, filed on Jul. 2, 2007, now Pat. No. 7,397,585, which is a division of application No. 11/336,974, filed on Jan. 23, 2006, now Pat. No. 7,253,928.

(30) Foreign Application Priority Data

Feb. 4, 2005 (JP) ............................. 2005-029298

(51) Int. Cl.
*G02B 7/00* (2006.01)
(52) U.S. Cl. ...................... 359/896; 358/483
(58) Field of Classification Search ............... 358/509, 358/408; 355/66; 359/861, 204, 857
See application file for complete search history.

(56) References Cited

U.S. PATENT DOCUMENTS 5,033,821 A  7/1991  Hama et al. ................. 359/889
5,315,414 A  5/1994  Beikirch et al. ............. 358/512
5,805,275 A  9/1998  Taylor ....................... 356/3.16
5,825,560 A  10/1998 Ogura et al. ................. 359/822
6,021,004 A  2/2000  Sekita et al. ................. 359/676
6,144,475 A  11/2000 Sheng ......................... 359/196
6,166,866 A  12/2000 Kimura et al. ............... 359/729
6,623,131 B2 9/2003  Ooki .......................... 359/857
6,636,360 B1 10/2003 Tanaka et al. ................ 359/678

(Continued)

FOREIGN PATENT DOCUMENTS

JP          8-292371         11/1996

(Continued)

*Primary Examiner*—Stephone B Allen
*Assistant Examiner*—Jennifer L. Doak
(74) *Attorney, Agent, or Firm*—Fitzpatrick, Cella, Harper & Scinto

(57) ABSTRACT

Obtained are an imaging optical system having a simple structure in which imaging position deviation due to deformation caused by a weight of an off-axial optical element is reduced and an image reading apparatus using the same. According to an imaging optical system for image reading, image information on an original surface is imaged on a sensor, and is read by the sensor. The imaging optical system includes reflection-type off-axial optical elements, each of which has an outer shape whose lengths in directions orthogonal to each other are different from each other and whose thickness is smaller than a length of the outer shape in a short-direction thereof and is made of a resin material. The plurality of off-axial optical elements are disposed such that mirror surfaces thereof are opposed to each other and constructed to satisfy a conditional expression.

6 Claims, 5 Drawing Sheets

U.S. PATENT DOCUMENTS

| | | | |
|---|---|---|---|
| 6,639,729 B2 | 10/2003 | Tanaka et al. | 359/676 |
| 6,858,853 B2 | 2/2005 | Antoni et al. | 250/492.2 |
| 6,894,263 B2 | 5/2005 | Fujibayashi et al. | 250/208 |
| 2004/0037387 A1 | 2/2004 | Antoni et al. | 378/34 |
| 2004/0066544 A1 | 4/2004 | Suga et al. | 358/509 |
| 2004/0136057 A1 | 7/2004 | Veith et al. | 359/350 |
| 2007/0036537 A1* | 2/2007 | You et al. | 396/333 |

FOREIGN PATENT DOCUMENTS

| | | |
|---|---|---|
| JP | 8-292372 | 11/1996 |
| JP | 9-005650 | 1/1997 |
| JP | 2002-335375 | 11/2002 |
| JP | 2003-057549 | 2/2003 |
| JP | 2003-287683 | 10/2003 |

* cited by examiner

IMAGING OPTICAL SYSTEM AND IMAGE READING APPARATUS USING THE SAME

BACKGROUND OF THE INVENTION

1. Field of the Invention

The present invention relates to an imaging optical system and an image reading apparatus using the imaging optical system. In particular, the present invention is suitable for reading a monochrome image or a color image using a line sensor of an image scanner, a digital copying machine, or the like in which various aberrations are corrected in a balanced manner to perform image reading with high resolution.

2. Related Background Art

Up to now, various image reading apparatuses have been proposed to read image information on a surface of an original. According to the proposed image reading apparatuses, a line sensor in which a plurality of light receiving elements are arranged in a main scanning direction is used to image the image information on a surface of the line sensor (CCD). The original and the line sensor are moved relative to each other in a sub-scanning direction to read the image information on the surface of the original or the like based on output signals obtained by the line sensor.

FIG. 7 is a schematic view showing a conventional image reading apparatus of a carriage integral type scanning system. In FIG. 7, an original 87 placed on an original table glass 82 is directly illuminated with a light beam emitted from an illumination light source 81. A light beam reflected on the original 87 travels through a first return mirror 83a, a second return mirror 83b, and a third return mirror 83c in this order, the light beam having its optical path bent in an inner portion of a carriage 86. Then, the light beam is imaged on a surface of a line sensor 85 by an imaging lens (imaging optical system) 84.

After that, the carriage 86 is moved in a direction indicated by an arrow A (sub-scanning direction) shown in FIG. 7 by a sub-scanning motor 88 to read the image information on the original 87. The line sensor 85 shown in FIG. 7 is composed of a plurality of light receiving elements arranged in a one-dimensional direction (main scanning direction).

FIG. 8 is an explanatory view showing a fundamental structure of a reading optical system of the image reading optical system shown in FIG. 7.

In FIG. 8, the reading optical system includes the imaging optical system 84 and the line sensor 85. The line sensor 85 is composed of line sensors 85R, 85G, and 85B for reading color information of R (red), G (green), and B (blue). Reading areas 87R, 87G, and 87B are set on the surface of the original 87 corresponding to the line sensors 85R, 85G, and 85B.

When the surface of the original 87 is scanned, the same location can be read in different colors at a certain time interval. In the case where the imaging optical system 84 includes an ordinary refracting system in the above-mentioned structure, longitudinal chromatic aberration and lateral chromatic aberration occur. Therefore, defocus or positional misregistration occurs in line images to be formed on the line sensors 85B and 85R as compared with the case of the line sensor 85G serving as a reference sensor. Thus, when the respective color images are superimposed for reproduction, color bleeding or misregistration is conspicuous in a resultant image. That is, when high-aperture performance and high-resolution performance are required, such requirements cannot be satisfied.

On the other hand, according to recent proposals, even in the case of a non-coaxial optical system, it is possible to construct an optical system whose aberrations are sufficiently corrected by introducing the concept of a reference axis to make constituent surfaces thereof asymmetrical and aspherical (see Japanese Patent Application Laid-Open No. H09-005650, Japanese Patent Application Laid-Open No. H08-292371, and Japanese Patent Application Laid-Open No. H08-292372). An example of a designing method of the optical system is disclosed in Japanese Patent Application Laid-Open H09-005650 and design examples thereof are disclosed in Japanese Patent Application Laid-Open H08-292371 and Japanese Patent Application Laid-Open No. H08-292372.

Such a non-coaxial optical system is called an off-axial optical system. The off-axial optical system is defined as an optical system including a curved surface (an off-axial curved surface) in which, when a reference axis is set along a light beam passing through the center of an image and the center of a pupil, a surface normal to a constituent surface at an intersection with the reference axis is not on the reference axis. At this time, the reference axis becomes a bent shape.

In the off-axial optical system, a constituent surface thereof normally becomes non-coaxial and no eclipse occurs even on a reflective surface thereof, so an optical system using the reflective surface is easy to construct. The off-axial optical system also has advantages that an optical path can be relatively freely drawn and that an integral type optical system is easy to produce by using a method of integrally molding constituent surfaces.

There has been disclosed an imaging optical system for image reading to which such a technique is adopted (see Japanese Patent Application Laid-Open No. 2002-335375). When the disclosed technique is used, an off-axial optical system including five or six reflective surfaces (off-axial reflective surfaces) in which there is no chromatic aberration and other aberrations are sufficiently corrected is achieved in an image reading apparatus. In addition to this, the image forming optical apparatus is reduced in size, so an optical system suitable for a carriage integral type is provided in the example.

It has been disclosed an imaging optical system for image reading to which the same technique is adopted (see Japanese Patent Application Laid-Open No. 2003-057549). In the example, an off-axial optical system including three reflective surfaces (off-axial reflective surfaces) is disclosed, which has an optical path length sufficient for an application to a 2:1 mirror scanning type scanner.

There has been disclosed an invention as to positional deviation of an imaging plane resulting from a change in temperature occurring in the case where a resin material is used to simplify the off-axial optical system (to reduce a cost) (see Japanese Patent Application Laid-Open No. 2003-287683).

On the other hand, in the case of such a reflection type off-axial optical system, it is difficult to maintain preferable optical performances with each of surfaces thereof formed in a spherical shape. However, when at least one surface is formed to be an aspherical surface (free surface) which is rotational asymmetrical, the preferable optical performances can be achieved.

It has been generally known that an optical system composed of refractive surfaces is sensitive to decentering. When a reflection type optical element having the aspherical surface (free surface) which is rotational asymmetrical is to be incorporated in the off-axial optical system, it is required that, in addition to the precision of a normal spherical reflective surface, a member for holding the normal spherical reflective surface and the reflection type optical element be formed with high precision.

In the case where the off-axial optical reflective surface is a reflective surface having a free surface shape, production of the off-axial optical system made of normal glass makes its manufacturing process complicated, which increases a cost thereof. In order to deal with such a problem, for example, the off-axial optical system may be made of plastic such as polycarbonate, acrylic, or polyolefin. However, in addition to a problem with the misregistration of an imaging position resulting from a change of environment, particularly, a change in temperature as described in Japanese Patent Application Laid-Open No. 2003-287683, there occurs another problem in that the optical element (off-axial optical element) deforms under its own weight to deviate the imaging position.

A resin material, which is normally used as an optical material, has a flexural modulus much smaller than that of a glass material, so the resin material easily deforms. When strength is merely provided to an optical element so as to prevent the optical element from deforming under its own weight, the optical element is made large and thickened. Thus, a time for molding the optical element lengthens or the number of cavities reduces, which leads to a problem in that manufacturing becomes difficult (thereby increasing a cost).

SUMMARY OF THE INVENTION

An object of the present invention is to provide an imaging optical system having a simple structure in which deviation of an imaging position due to deformation caused by a weight of an off-axial optical element is reduced and an image reading apparatus using the imaging optical system. In particular, an object of the present invention is to provide an image reading apparatus suitable for the case where a resin material is used as a material of the off-axial optical element.

According to one aspect of the invention, an imaging optical system for image reading, in which image information on a surface of an original is imaged on a line sensor and the image information is read by the line sensor, includes:

a plurality of off-axial optical elements, each of which is a reflection type and made of a resin material, and in the imaging optical system for image reading, when a line direction of the line sensor is a main scanning direction and a direction orthogonal to the main scanning direction is a sub-scanning direction, a length of each of the off-axial optical elements in the main scanning direction is longer than a length thereof in the sub-scanning direction and a thickness of each of the off-axial optical elements is smaller than the length thereof in the sub-scanning direction, and also in the imaging optical system for image reading, in a sub-scanning section in which the main scanning direction corresponds to a normal, the following condition is satisfied, $$-30°<\theta a-\theta b<30°,$$

where $\theta a$ represents an absolute value of a first angle formed between a surface normal to a reflective surface of a first off-axial optical element of the plurality of off-axial optical elements at a reflection point of the reflective surface of the first off-axial optical element on which a reference axis light beam is reflected and an optical path of a reference axis light beam incident on the imaging optical system and $\theta b$ represents an absolute value of a second angle formed between a surface normal to a reflective surface of a second off-axial optical element opposed to the reflective surface of the first off-axial optical element at a reflection point of the reflective surface of the second off-axial optical element on which the reference axis light beam is reflected and the optical path of the reference axis light beam incident on the imaging optical system.

According to a further aspect of the invention, in the imaging optical system for image reading, each of the off-axial optical elements comprises a reflective surface which is symmetrical with respect to a reference axis in the main scanning direction and asymmetrical with respect to the reference axis in the sub-scanning direction.

According to a further aspect of the invention, in the imaging optical system for image reading, the plurality of off-axial optical elements include thicknesses different from one another.

According to a further aspect of the invention, in the imaging optical system for image reading, when n is a positive integer, the imaging optical system comprises 2n (0<n<3) off-axial optical elements.

According to a further aspect of the invention, in the imaging optical system for image reading, the plurality of off-axial optical elements are held in a holding portion of a lens barrel, and the off-axial optical elements are different from one another in a position of a portion of the off-axial optical element which abuts the holding portion of the lens barrel.

According to a further aspect of the invention, in the imaging optical system for image reading, when a thickness of an arbitrary off-axial optical element of the plurality of off-axial optical elements is expressed by Lz and a length thereof in the sub-scanning direction is expressed by Ly, the Following condition is satisfied, $$1.5<Ly/Lz<20$$

where Lz represents a thickness of an arbitrary off-axial optical element of said plurality of off-axial optical elements and Ly represents said length in the sub-scanning direction.

According to a further aspect of the invention, the imaging optical system for image reading further includes an aperture stop located on an optical path between the first off-axial optical element and the second off-axial optical element.

According to another aspect of the invention, an image reading apparatus includes the imaging optical system for image reading set out in the foregoing; an original table on which the original is placed; and the line sensor.

According to the present invention, it is possible to obtain an imaging optical system which is used for an image reading apparatus including a line sensor and an imaging optical system composed of an off-axial optical element made of a resin material, such as an image scanner or a digital copying machine, and which has a simple structure in which deviation of an imaging position due to deformation caused by a weight of the off-axial optical element is reduced. In addition, it is possible to obtain the image reading apparatus using the imaging optical system.

DESCRIPTION OF THE PREFERRED EMBODIMENTS

An indicating manner of constituent specifications of an imaging optical system (optical system) used in each of the embodiments of the present invention and common items to all the embodiments will be described before the description of each of the embodiments.

Figure 9:
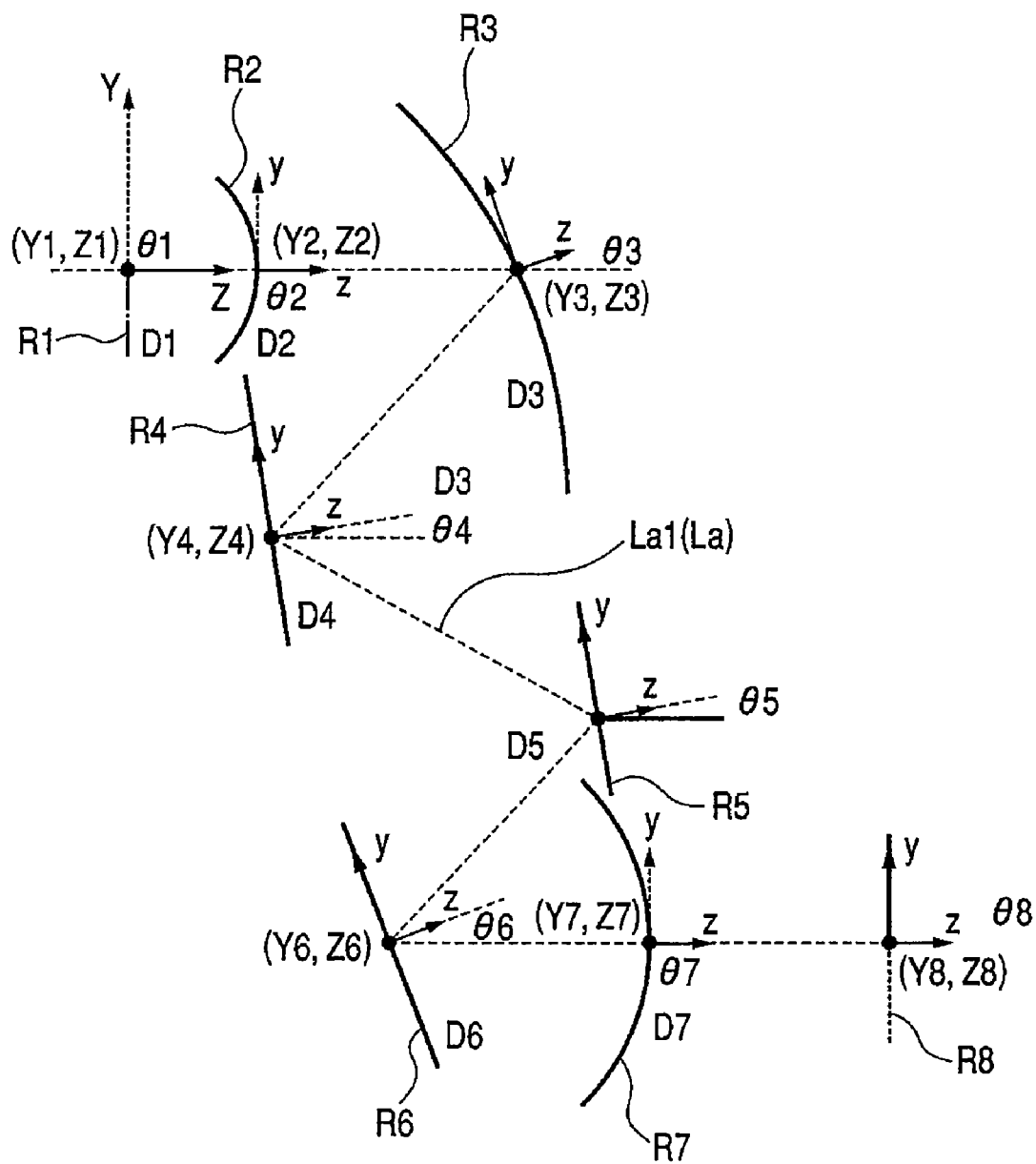
FIG. 9 is a diagram for explaining a definition of an off-axial optical system.

FIG. 9 is an explanatory diagram showing a coordinate system for defining constituent data of an imaging optical system according to the present invention. In each of the embodiments, assume that an i-th plane located on an optical path of a light beam (reference axis light beam La1 which is indicated by a dashed line in FIG. 9 and described later) traveling from an object side to an imaging plane is an i-th plane.

In FIG. 9, a first plane R1 indicates an aperture stop. A second plane R2 indicates a refractive surface which is coaxial to the first plane R1. A third plane R3 indicates a reflective surface tilted relative to the second plane R2. A fourth plane R4 indicates a reflective surface which is shifted and tilted relative to the third plane R3. A fifth plane R5 indicates a reflective surface which is shifted and tilted relative to the fourth plane R4. A sixth plane R6 indicates a reflective surface which is shifted and tilted relative to the fifth plane R5. A seventh plane R7 indicates a refractive surface which is shifted and tilted relative to the sixth plane R6. The respective planes of the second plane R2 to the seventh plane R7 are provided in an optical element made of a transparent medium such as glass or plastic.

Therefore, in the structure shown in FIG. 9, a medium between an object plane (not shown) and the second plane R2 is air, a medium between the second plane R2 and the seventh plane R7 is a common medium, and a medium between the seventh plane R7 and an eighth plane (such as an imaging plane) R8 is air.

The imaging optical system according to the present invention is an off-axial optical system, so the second plane R2 to the seventh plane R7 composing the imaging optical system do not include a common optical axis.

Therefore, first, an absolute coordinate system in which the center of an effective light beam diameter of the first plane R1 is an origin is set in each of the embodiments. Then, in each of the embodiments, a center point of the effective light beam diameter of the first plane R1 is set as an origin. An optical path of the light beam (reference axis light beam) La1 passing through the origin and the final imaging plane R8 is defined as a reference axis La of the imaging optical system. The reference axis La in each of the embodiments has a direction (orientation). The direction corresponds to a direction in which the reference axis light beam La1 travels for imaging.

In each of the embodiments of the present invention, the reference axis of the imaging optical system as a reference is set as described above. The reference axis to be employed for the imaging optical system may be an axis that is appropriate in view of an optical design of the system, attaining correct aberrations in a balanced manner, or expressing respective plane shapes composing the imaging optical system. However, an optical path of a light beam passing through the center of the imaging plane and any one of an aperture stop, an entrance pupil, an exit pupil, the center of the first plane of the imaging optical system, and the center of the final plane thereof, is normally set as the reference axis of the imaging optical system as a reference.

In other words, the optical path of the light beam (reference axis light beam) which passes through the center point of the effective light beam diameter of the first plane R1, that is, the surface of the aperture stop, is refracted by the refractive surfaces and deflected on the reflective surfaces, and reaches the center of the final imaging plane is set as the reference axis La in each of the embodiments of the present invention. The order of each of the surfaces is set corresponding to an order in which the reference axis light beam La1 is subjected to refraction or reflection.

Thus, the direction of the reference axis La is changed according to the set order of each of the surfaces based on the law of refraction or reflection, and the reference axis La finally reaches the center of the imaging plane.

All tilt surfaces composing the imaging optical system according to each of the embodiments of the present invention are fundamentally tilted within the same plane. Therefore, each axis of absolute coordinate system is determined as follows. Z-axis: Reference axis that passes through the origin and extends to the second plane R2 Y-axis: Straight line that passes through the origin and is rotated counterclockwise by 90° relative to the Z-axis within a tilt plane (paper of FIG. 9) X-axis: Straight line that passes through the origin and is perpendicular to each of the Z-axis and the Y-axis (straight line perpendicular to the paper of FIG. 9)

A plane shape of the i-th plane composing the imaging optical system is expressed by using a local coordinate system, in which an intersection of the reference axis and the i-th plane is set as an origin, so that the plane shape can be recognized more easily, rather than by using the absolute coordinate system. Therefore, in the embodiment showing constituent data with respect to the imaging optical system according to the present invention, the plane shape of the i-th plane is expressed by using the local coordinate system.

A tilt angle of the i-th plane within the YZ plane is expressed by an angle $\theta i$ (unit: degree) in a case where a counterclockwise direction relative to the Z-axis of the absolute coordinate system is positive. Therefore, in each of the embodiments of the present invention, a local coordinate origin of each plane is located on the YZ plane shown in FIG. 9. There is no plane decentering on each of the XZ plane and the XY plane. The y- and z-axes of the local coordinates (x, y, and z) of the i-th plane are tilted relative to the absolute coordinate system (X, Y, Z) within the YZ plane by the angle $\theta i$, and more specifically set as follows.

z-axis: Straight line that passes through the origin of the local coordinate system and is rotated counterclockwise by the angle $\theta i$ relative to the Z-direction of the absolute coordinate system within the YZ-plane y-axis: Straight line that passes through the origin of the local coordinate system and is rotated counterclockwise by 90° relative to the z-direction within the YZ plane x-axis: Straight line that passes through the origin of the local coordinate system and is perpendicular to the YZ-plane Reference symbol $Di$ denotes a scalar indicating an interval between the origins of the local coordinate systems of the i-th plane and an (i+1)th plane. Reference symbols Ndi and vdi denote a refractive index of a medium between the i-th plane and the (i+1)th plane and Abbe number thereof, respectively.

In each of the embodiment of the present invention, the sectional view of the optical system and numerical data thereof are provided.

A spherical surface has a shape expressed by the following expression.

$$z=((x^2+y^2)/r_i)/(1+(1-(x^2+y^2)/r_i^2)^{1/2}$$

The imaging optical system according to each of the embodiments of the present invention has an aspherical surface which is rotational asymmetrical. A shape of the aspherical surface is expressed by the following expression.

$$z=C_{02}y^2+C_{20}x^2+C_{03}y^3+C_{21}x^2y+C_{04}y^4+C_{22}x^2y^2+ \\ C_{40}x^4+C_{40}x^4+C_{05}y^5+C_{23}x^2y^3+C_{41}x^4y+C_{06}y^6+ \\ C_{24}x^2y^4+C_{42}x^4y^2+C_{60}x^6 \ldots$$

The above-mentioned curved surface expression holds only an even number order term for x, so a curved surface specified by the curved surface expression has a surface symmetrical shape with respect to the yz-plane as a symmetrical surface.

The imaging optical system according to each of the embodiments is not a coaxial optical system, so it is difficult to directly calculate a focal length based on paraxial theory. Therefore, a conversion focal length $f_{eq}$ defined by the following expression is used.

$$f_{eq}=h_1/\tan(a_k')$$

By definition when the number of reflective surfaces is odd, a sign of the focal length is expressed in reverse to a normal sign. Here, $h_1$ represents incident height of a light beam incident on the first plane from a direction which is parallel to the reference axis and closest to the reference axis, and $a_k'$ represents angle formed between a direction of the light beam exited from the final plane and the reference axis.

EMBODIMENT 1

Figure 1:
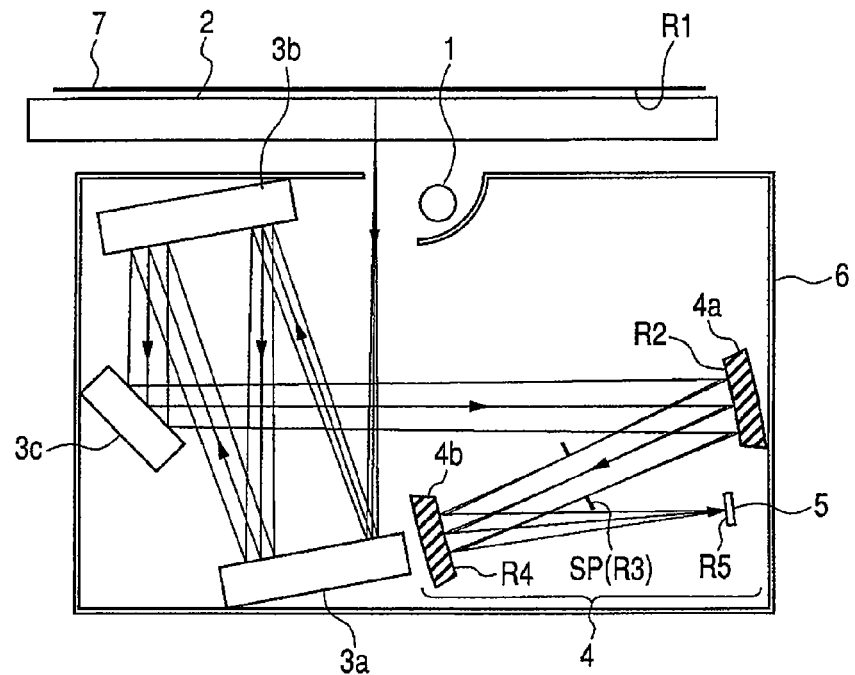
FIG. 1 is a schematic view showing a principal part of an image reading apparatus according to Embodiment 1 of the present invention.

FIG. 1 is a schematic sub-scanning sectional view showing a principal part of an image reading apparatus to which an imaging optical system according to Embodiment 1 of the present invention is applied.

Figure 2:
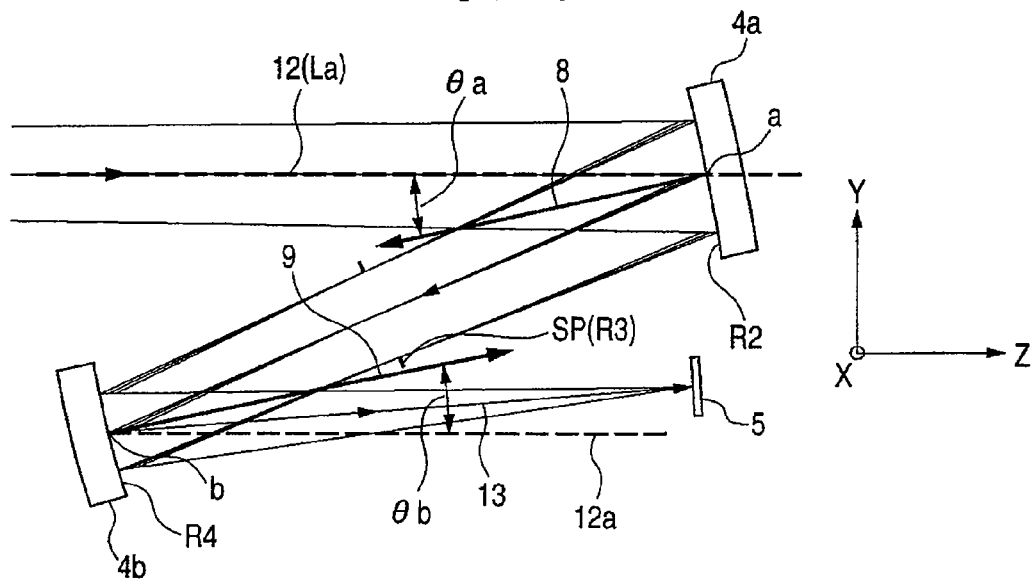
FIG. 2 is a sectional view showing an imaging optical system according to Embodiment 1 of the present invention.

FIG. 2 is a schematic sub-scanning sectional view in a case where the imaging optical system 4 shown in FIG. 1 is extracted.

In FIG. 1, a light source (light source means) 1 is composed of a fluorescent lamp, a xenon lamp, or the like. An original (object) 7 is placed on an original table glass 2. Reference numerals 3a, 3b, and 3c indicate a first reflecting mirror, a second reflecting mirror, and a third reflecting mirror, respectively.

A light beam based on image information of an original 7 is imaged on a line sensor 5 serving as a reading means by an imaging optical system (off-axial optical system) 4 for image reading.

In this embodiment, the imaging optical system 4 includes two first and second reflection type off-axial optical elements (reflection type off-axial optical elements) 4a and 4b which are disposed in the stated order from the original 7 side, each of which has an outer shape in which lengths in directions orthogonal to each other are different from each other. Each of the first and second off-axial optical elements 4a and 4b has a thickness smaller than a short-directional length of the outer shape and is made of a resin material. Mirror surfaces (off-axial reflective surface) R2 and R4 of the first and second off-axial optical elements 4a and 4b are opposed to each other. Each of the first and second off-axial optical elements 4a and 4b more specifically has a rectangular shape and is formed such that a length thereof in a thickness direction is shorter than a short-directional (short-side directional) length thereof.

In this embodiment, each of the mirror surfaces (off-axial reflective surfaces) of the first and second off-axial optical elements 4a and 4b has a main scanning directional (long-directional) length which is longer than a sub-scanning directional (short-directional) length and a main scanning directional (long-directional) thickness which is smaller than a sub-scanning directional (short-directional) length.

An aperture stop SP (R3) is disposed between the first off-axial optical element 4a and the second off-axial optical element 4b.

A line sensor (light receiving means) 5 is composed of a CCD or the like, and disposed in a position corresponding to the imaging plane. A carriage (case) 6 houses the light source 1, the first reflecting mirror 3a, the second reflecting mirror 3b, the third reflecting mirror 3c, the imaging optical system 4, and the line sensor 5.

Here, a pixel arrangement direction (direction perpendicular to the paper, an X-direction) of the line sensor 5 corresponds to a main scanning direction, and a direction orthogonal to the main scanning direction (direction within the paper, a Y-direction) corresponds to a sub-scanning direction. Assume that a traveling direction of a light beam is a Z-direction. At this time, an XY plane corresponds to a main scanning section, and a YZ plane corresponds to a sub-scanning section.

In this embodiment, the original (object) 7 placed on the original table glass 2 is illuminated with a light beam emitted from the light source 1. A light beam reflected on the original 7 travels through the first reflecting mirror 3a, the second reflecting mirror 3b, and the third reflecting mirror 3c. Then, the light beam is imaged on the line sensor 5 by the imaging optical system 4. At this time, the original 7 and the carriage 6 are moved relative to each other in the sub-scanning direction (direction indicated by an arrow A) to two-dimensionally read the original 7.

In order to make the image reading apparatus compact, an optical path of the light beam is folded using the first reflecting mirror 3a, the second reflecting mirror 3b, and the third reflecting mirror 3c. The imaging optical system 4 also contributes to fold the optical path. The optical path is folded in a substantial Z-shape in the imaging optical system 4 to facilitate the canceling of decentering caused in the off-axial reflective surfaces R2 and R4. Therefore, preferable imaging performance is obtained regardless of the structure having the surfaces which is as small in number as two.

In order to obtain more preferable imaging performance, the off-axial reflective surfaces R2 and R4 are formed in an asymmetrical free surface shape with respect to the sub-scanning section (YZ-plane) within the sub-scanning section. Therefore, decentering caused by folding the optical path in the sub-scanning direction is preferably corrected.

As shown in FIG. 2, an incident reference axis light beam 12 incident on the first off-axial optical element 4a of the imaging optical system 4 is extended for ease of understanding. Hereinafter, a reference axis light beam incident on the imaging optical system 4 is referred to as an "incident reference axis light beam". A reference axis light beam 13 exited from the second off-axial optical element 4b is parallel to or substantially parallel to the incident reference axis light beam 12 incident on the first off-axial optical element 4a. An axis 12a is parallel to the optical path of the incident reference axis light beam 12.

Reference numeral 8 denotes a surface normal to the mirror surface R2 of the first off-axial optical element 4a at a point "a" on which the incident reference axis light beam 12 is reflected. Reference numeral 9 denotes a surface normal to the mirror surface R4 of the second off-axial optical element 4b at a point "b" on which the reference axis light beam 13 is reflected.

Reference symbol θa denotes an absolute value of an angle formed between the surface normal 8 and the optical path of the incident reference axis light beam 12. Reference symbol θb denotes an absolute value of an angle formed between the surface normal 9 and the axis 12a parallel to the optical path of the incident reference axis light beam 12.

In this embodiment, the gravity acts in a lower direction of FIG. 1 and an optical arrangement is made to be relatively less influenced by the gravity. However, the influence of the gravity is not zero, so the off-axial optical elements are deformed. Further, an optical arrangement in which the original table glass 2 is removed and the carriage 6 and the members housed therein are tilted in a document feeder may be more likely to be influenced by the gravity.

In this embodiment, the absolute value θa of the angle formed between the surface normal 8 and the optical path of the incident reference axis light beam 12 and the absolute value θb of the angle formed between the surface normal 9 and the axis 12a are set so as to satisfy the following condition.

$$-30° < θa - θb < 30° \quad (1)$$

The conditional expression (1) is a condition for specifying the absolute values θa and θb of the angles. When the conditional expression (1) is not satisfied, it is not preferable because the deviation of an imaging position due to the deformation of the off-axial optical element which is caused by its own weight becomes larger, making it difficult to cancel the deformation of the surface (mirror surface).

The conditional expression (1) may be more preferably set as follows.

$$-15° < θa - θb < 15° \quad (1a)$$

In this embodiment, the absolute values θa and θb of the angles are set as follows.

$$θa = 11.63°, θb = 13.93°$$

Therefore, the following is obtained.

$$θa - θb = -2.3°$$

This value satisfies the conditional expression (1).

In this embodiment, the imaging optical system 4 for image reading does not include a refractive surface with power, and the two off-axial optical elements 4a and 4b have the reflective surfaces. This reason is as follows. When a structure having a refractive function in each of an incident surface and an exit surface, such as a prism, is used, a problem resulting from the deformation caused by self weight reduces. However, chromatic aberration is caused by optical properties of a glass material of the prism, so color misregistration occurs in a read image. Therefore, the plurality of off-axial optical elements are used rather than an off-axial optical element which is a single block, and each of the off-axial optical elements is made of the resin material for ease of production.

Because of a specific feature of the imaging optical system for forming an image on the line sensor, each of the off-axial optical elements has an outer shape in which a longitudinal (Y-directional) length is different from a lateral (X-directional) length. That is, there are a long side and a short side. The longitudinal length can be forcedly made equal to the lateral length. However, an unnecessary portion of the off-axial optical element increases accordingly, which increases a size of the imaging optical system on the sub-scanning section to be very large. When the thickness (Z-direction) of the off-axial optical element is set to a value smaller than a short-side directional (Y-directional) length, a die structure for producing the off-axial optical element is simplified. Therefore, surface precision is improved, and the size of the imaging optical system is reduced.

When the length of the off-axial optical element in the thickness direction is set to a shortest length, surface deformation is easily caused substantially in a mirror surface direction, with the result that a cancel relationship between an arrangement of the off-axial optical elements whose mirror surfaces are opposed to each other and the deviation of the imaging position is easily established. On the other hand, when the off-axial optical element is thickened and thus the short-side directional length thereof becomes thinnest, the surface thereof is deformed in a warped shape in the long side direction (X-direction), so the cancel relationship with the arrangement of the off-axial optical elements whose mirror surfaces are opposed to each other is not held.

Even when the off-axial optical elements 4a and 4b whose mirror surfaces R2 and R4 are opposed to each other are not completely opposed to each other, the deviation of the imaging position due to the deformation of the surfaces thereof can be cancelled. When the sizes of the opposed off-axial optical elements are different from each other, the case where they are slightly shifted to each other may be better than the case where they are completely opposed to each other. Therefore, in this embodiment, a range (width) of the angle difference is provided as expressed by the conditional expression (1).

In this embodiment, each of the first and second off-axial optical elements 4a and 4b has a reflective surface with a free surface shape, which is symmetrical with respect to the reference axis La in the main scanning direction (symmetrical with respect to the YZ-section) and asymmetrical in the sub-scanning direction (within sub-scanning section).

This is because the imaging optical system 4 in this embodiment is the off-axial optical system decentered within the sub-scanning section. Therefore, the surface shape within the sub-scanning section is asymmetrical. Although the surface shape within the main scanning section is symmetrical, both contact ends of each of the off-axial optical elements in the main scanning direction are connected to a lens barrel at three points, so one of the contact ends has one point and the other of the contact ends has two points. Therefore, the off-axial optical element is not completely symmetrical. However, when the off-axial optical element becomes too asymmetrical, it is difficult to cancel the deviation of the imaging position due to the deformation of the surface. Thus, it is preferable that the off-axial optical element be symmetrical.

In this embodiment, the thicknesses of the first and second off-axial optical elements 4a and 4b are adjusted based on the outside dimension of the off-axial optical elements 4a and 4b.

This is because, when the sizes of the opposed off-axial optical elements are different from each other, the amount of deformation changes. Therefore, the thicknesses of the off-axial optical elements are adjusted based on the sizes thereof to facilitate the canceling of deviation of the imaging position resulting from the deformation.

In this embodiment, when n is a positive integer, the imaging optical system 4 includes 2n (0<n<3) off-axial optical elements.

This is because, when all off-axial optical elements of the imaging optical system are arranged such that the mirror surfaces thereof are opposed to each other, the deviation of the imaging position can be cancelled by all the off-axial optical elements. Therefore, it is preferable to use the off-axial optical elements which are the multiples of 2. Note that, when the total number of surfaces is too large, it is difficult to produce the off axial optical elements. Thus, n is set so as to satisfy 0<n<3 in this embodiment. Although the number of off-axial optical elements is specified, the number of surfaces in design is not specified.

In this embodiment, when the first and second off-axial optical elements 4a and 4b are to be held in a holding portion of the lens barrel, positions of portions of each of the first and second off-axial optical elements 4a and 4b, which are connected to the holding portion of the lens barrel, are adjusted for each thereof.

This reason is to control a deformation shape of the surface, because the off-axial optical elements are different from each other in size, shape, and assembly position to the lens barrel.

In this embodiment, when the short-directional length of an arbitrary off-axial optical element is expressed by Ly and the length thereof in the thickness direction is expressed by Lz, the following condition is satisfied.

$$1.5 < Ly/Lz < 20 \quad (2)$$

The conditional expression (2) is a more detailed conditional expression for setting the thickness of the off-axial optical element described above to a value smaller than the short-side directional length. When Ly/Lz is smaller than a lower limit value of the conditional expression (2), it is not preferable because the thickness of the off-axial optical element is too large and a time for producing the off-axial optical element becomes longer, leading to a problem in which it is difficult to maintain preferable surface precision. On the other hand, when Ly/Lz exceeds an upper limit value of the conditional expression (2), it is not preferable because the thickness of the off-axial optical element is too small and that a sufficient strength cannot be obtained, leading to a problem in which the deformation is caused when assembled to the lens barrel.

The conditional expression (2) may be more preferably set as follows.

$$1.6 < Ly/Lz < 15 \quad (2a)$$

In this embodiment, when the lengths of the first and second off-axial optical elements 4a and 4b in the thickness direction are expressed by Lz1 and Lz2 respectively, each of Lz1 and Lz2 is set to 3 mm and a margin between an effective portion and an outer periphery, which is 1 mm, is added to a length of an effective light beam area in the short-side direction at both sides thereof. When the lengths of the first and second off-axial optical elements 4a and 4b in the short-side direction are expressed by Ly1 and Ly2, respectively, Ly1 and Ly2 are set as follows.

$$Ly1=6.4, Ly2=5.1$$

Therefore, the followings are obtained.

$$Ly1/Lz1=21.3, Ly2/Lz2=1.7$$

Each of the values satisfies the conditional expression (2).

In this embodiment, the aperture stop SP (R3) is provided on an optical path between the first and second off-axial optical elements 4a and 4b, thereby reducing a size of the off-axial reflective surface.

Numerical data in a numerical embodiment of the imaging optical system for image reading, which corresponds to Embodiment 1 of the present invention as described above, are shown below.

Numerical Embodiment 1
  Original read width=220 mm
  Imaging magnification=−0.189
  Optical element thickness=3 mm
  Original side NA=0.016
  $f_{eg}$=29.680

TABLE 1

| i | Yi | Zi | θi | Ndi | Ly | |
|---|------|--------|------|-----|-----|---|
| 1 | 0 | 0 | 0 | 1 | | Object plane (original surface) |
| 2 | 0 | 166.8934 | 11.63 | 1 | 6.4 | Reflective plane |
| 3 | −5.1695 | 154.8658 | 23.26 | 1 | | Transmission plane (aperture stop) |
| 4 | −9.6119 | 144.5325 | 13.93 | 1 | 5.1 | Reflective plane |
| 5 | −7.8571 | 166.3281 | 4.60 | | | Imaging plane |

Aspheric Configuration surface R2

C02=−4.5460E-03 C03=1.8570E-05 C04=−1.9333E-05

C05=1.2781E-06 C06=1.5282E-06 C07=−2.6256E-07

C08=4.0099E-08 C20=−4.7534E-03 C21=6.3040E-05

C22=−4.0753E-06 C23=−5.3171E-08 C24=5.5317E-07

C25=2.3713E-08 C26=−4.2652E-08 C40=2.5124E-06

C41=−6.5956E-08 C42=−2.5347E-09 C43=−8.2587E-10

C44=−8.2235E-10 C60=−3.3116E-09 C61=2.3522E-11

C62=6.4321E-11 C80=3.3081E-12 surface R4

C02=6.8081E-03 C03=6.1342E-05 C04=−8.7196E-05

C05=−4.3217E-05 C06=1.5179E-05 C07=1.0360E-05

C08=6.6517E-07 C20=6.9865E-03 C21=8.4961E-05

C22=8.3621E-06 C23=5.2533E-07 C24=3.4662E-06

C25=−1.4766E-07 C26=−5.7376E-07 C40=−6.0197E-06

C41=−1.6224E-07 C42=2.0695E-08 C43=7.9461E-10

C44=−6.8943E-09 C60=1.5482E-08 C61=3.6681E-10

C62=−1.4023E-10 C80=−3.0158E-11

As described above, in this embodiment, the imaging optical system 4 includes the two off-axial optical elements. Therefore, even when a deformable resin material is used, it is possible to reduce the deviation of the imaging position due to the deformation caused by the self weight of the off-axial optical element. In addition, it is possible to obtain the image reading apparatus which is easily manufactured and has a simple structure.

Embodiment 2

Figure 3:
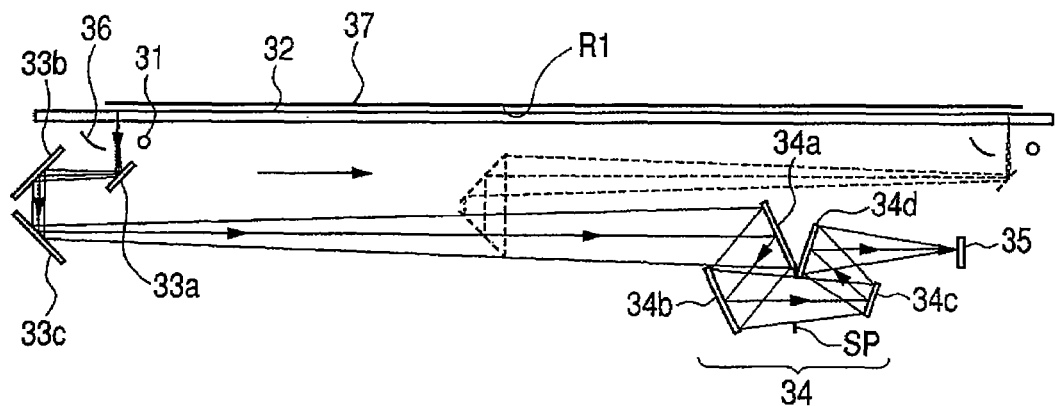
FIG. 3 is a schematic view showing a principal part of an image reading apparatus according to Embodiment 2 of the present invention.
Figure 4:
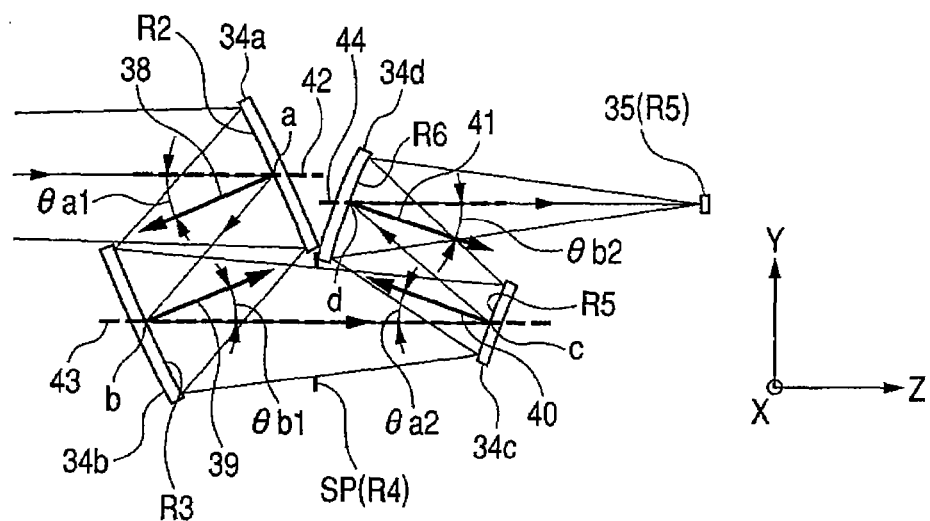
FIG. 4 is a sectional view showing an imaging optical system according to Embodiment 2 of the present invention.

FIG. 3 is a schematic sub-scanning sectional view showing a principal part of an image reading apparatus to which an imaging optical system according to Embodiment 2 of the present invention is applied. FIG. 4 is a schematic sub-scanning sectional view in the case where the imaging optical system 34 shown in FIG. 3 is extracted.

A point in this embodiment which is different from Embodiment 1 described earlier is that an imaging optical system 34 including first, second, third, and fourth off-axial optical elements 34a, 34b, 34c, and 34d is applied to an image reading apparatus including a 2:1 mirror scanning type optical system. Other structures and optical functions are identical to those in Embodiment 1 and thus the same effect is obtained.

That is, in FIG. 3, a light beam based on image information of an original 37 is imaged on a line sensor 35 serving as a reading means by the imaging optical system (off-axial optical system) 34 for image reading.

In this embodiment, the imaging optical system 34 includes the first, second, third, and fourth reflection type off-axial optical elements 34a, 34b, 34c, and 34d which are disposed in order from the original 37 side, each of which is made of a resin material. In order to satisfy the conditional expression (1), the first and second off-axial optical elements 34a and 34b are disposed such that the mirror surfaces (off-axial reflective surfaces) R2 and R3 thereof are opposed to each other and the third and fourth off-axial optical elements 34c and 34d are disposed such that the mirror surfaces R5 and R6 thereof are opposed to each other. Each of the first, second, third, and fourth off-axial optical elements 34a, 34b, 34c, and 34d is formed such that the length thereof in the thickness direction (Z-direction) becomes shorter than the short-side directional (Y-directional) length thereof.

In this embodiment, each of the mirror surfaces (off-axial reflective surfaces) of the first, second, third, and fourth off-axial optical elements 34a, 34b, 34c, and 34d has a main scanning directional (long-directional) length which is longer than a sub-scanning directional (short-directional) length and a main scanning directional (long-directional) thickness which is shorter than a sub-scanning directional (short-directional) thickness.

In this embodiment, the original 37 is illuminated with a direct light beam emitted from a light source 31 or an indirect light beam emitted therefrom through a reflection hat 36. A light beam reflected on the original 37 travels through first, second, and third reflecting mirrors 33a, 33b, and 33c. Then, an optical path of the light beam is bent in an inner portion of a main body and the light beam is imaged on the line sensor 35 by the imaging optical system 34. At this time, while the first, second, and third reflecting mirrors 33a, 33b, and 33c are moved in the sub-scanning direction, electrical scanning is performed in the main scanning direction, thereby reading the image information of the original 37. The second and third reflecting mirrors 33b and 33c are moved by half the amount of movement of the first reflecting mirror 33a to make a distance between the original 37 and the line sensor 35 constant.

In this embodiment, the image reading apparatus including the 2:1 mirror scanning type optical system in which a space for moving the light source 31 and the first reflecting mirror 33a is ensured and a portion protruded downward is reduced is obtained using the above-mentioned imaging optical system 34.

In this embodiment, the optical path of imaging optical system 34 can be relatively freely drawn, so the original 37 surface and the line sensor 35 can be relatively freely located. However, there are a package and the like around a sensor portion of the line sensor 35. In addition, a circuit such as a board and various members for suitably mounting the line sensor 35 are located in rear of the line sensor 35. Therefore, the original 37 surface and the line sensor 35 should be located so as to prevent the optical path from being broken by the line sensor 35 and the members adjacent thereto. When the line sensor 35 is located under the imaging optical system 34, the various members are protruded downward. In addition to this, mirrors located above the line sensor 35 are influenced by heat generated thereby, this causes a deterioration of image performance.

In order to avoid such problems, it is preferable that an angle formed between an incident reference axis light beam 42 incident on the first off-axial optical element 34a of the imaging optical system 34 and a reference axis light beam 44 incident on the line sensor 35 become equal to or smaller than a predetermined angle (45 degrees). In this embodiment, both the reference axis light beams are parallel to each other, that is, the angle formed therebetween becomes 0 degrees.

As shown in FIG. 4, the incident reference axis light beam 42 incident on the first off-axial optical element 34a of the imaging optical system 34 is extended for the purpose of simplification. A reference axis light beam 43 which is exited from the second off-axial optical element 34b or incident on the third off-axial optical element 34c becomes parallel to the incident reference axis light beam 42 incident on the first off-axial optical element 34a and extended for the purpose of simplification. The reference axis light beam 44 which is exited from the fourth off-axial optical element 34d becomes parallel to the incident reference axis light beam 42 incident on the first off-axial optical element 34a.

Reference numeral 38 denotes a surface normal to the mirror surface R2 of the first off-axial optical element 34a at a reflection point "a" on which the incident reference axis light beam 42 is reflected. Reference numeral 39 denotes a surface normal to the mirror surface R3 of the second off-axial optical element 34b at a reflection point "b" on which the reference axis light beam 43 is reflected. Reference numeral 40 denotes a surface normal to the mirror surface R5 of the third off-axial optical element 34c at a reflection point "c" on which the reference axis light beam 43 is reflected. Reference numeral 41 denotes a surface normal to the mirror surface R6 of the fourth off-axial optical element 34d at a reflection point "d" on which the reference axis light beam 44 is reflected.

Reference symbol θa1 denotes an absolute value of an angle formed between the surface normal 38 and the optical path of the incident reference axis light beam 42. Reference symbol θb1 denotes an absolute value of an angle formed between the surface normal 39 and the optical path of the reference axis light beam 43 (incident reference axis light beam 42). Reference symbol θa2 denotes an absolute value of an angle formed between the surface normal 40 and the optical path of the reference axis light beam 43 (incident reference axis light beam 42). Reference symbol θb2 denotes an absolute value of an angle formed between the surface normal 41 and the optical path of the reference axis light beam 44 (incident reference axis light beam 42).

In this embodiment, the gravity acts in the downward direction of FIG. 4.

In this embodiment, the absolute values θa1, θb1, θa2, and θb2 of the respective angles are set so as to satisfy the conditional expression (1).

That is, in this embodiment, the absolute values θa1 and θb1 of the angles with respect to the first and second off-axial optical elements 34a and 34b disposed such that the mirror surfaces R2 and R3 thereof are opposed to each other are set as follows.

θa1=25°, θb1=25°

In addition, the absolute values θa2 and θb2 of the angles with respect to the third and fourth off-axial optical elements 34c and 34d disposed such that the mirror surfaces R5 and R6 thereof are opposed to each other are set as follows.

θa2=20°, θb2=20°

Therefore, the followings are obtained.

$\theta a1-\theta b1=0°, \theta a2-\theta b2=0°$

Each of the values satisfies the conditional expression (1).

In this embodiment, when the lengths of the first, second, third, and fourth off-axial optical elements 34a, 34b, 34c, and 34d in the thickness direction are expressed in order by Lz1, Lz2, Lz3, and Lz4, each of Lz1, Lz2, Lz3, and Lz4 is set to 3 mm and a margin between an effective portion and an outer periphery, which is 1 mm, is added to a length of an effective light beam area in the short-side direction at both sides thereof. When the lengths of the first, second, third, and fourth off-axial optical elements 34a, 34b, 34c, and 34d in the short-side direction are expressed in order by Ly1, Ly2, Ly3, and Ly4, Ly1, Ly2, Ly3, and Ly4 are set as follows.

$Ly1=35, Ly2=36$ $Ly3=18, Ly4=26$

Therefore, the followings are obtained.

$Ly1/Lz1=11.7, Ly2/Lz2=12.0$ $Ly3/Lz3=6.0, Ly4/Lz4=8.7$

Each of the values satisfies the conditional expression (2).

In this embodiment, the aperture stop SP (R4) is provided on an optical path between the second and third off-axial optical elements 34b and 34c, thereby reducing a size of the off-axial reflective surface.

Numerical data in Numerical embodiment 2 of the imaging optical system for image reading, which corresponds to Embodiment 2 of the present invention as described above are shown below.

Numerical Embodiment 2:
 Original read width=304.8
 Imaging magnification=−0.22028
 Element thickness=3 mm
 Original side NA=0.02
 $f_{eg}$=149.45

TABLE 2

| i | Yi | Zi | θi | Ndi | Ly | |
|---|---|---|---|---|---|---|
| 1 | 0.0 | 0.0 | 0.0 | 1.0 | | Object plane (original surface) |
| 2 | 0.0 | 454.6167 | 25.0 | 1.0 | 35 | Reflective plane |
| 3 | −30.6418 | 428.9052 | −25.0 | 1.0 | 36 | Reflective plane |
| 4 | −30.6418 | 463.9052 | 0.0 | 1.0 | | Transmission plane (aperture stop) |
| 5 | −30.6418 | 498.9052 | −20.0 | 1.0 | 18 | Reflective plane |
| 6 | −6.2158 | 469.7955 | 20.0 | 1.0 | 26 | Reflective plane |
| 7 | −6.2158 | 542.5317 | 0.0 | | | Imaging plane |

Aspheric Configuration surface R2

$C_{02}=-3.2176e-04$ $C_{03}=3.7018e-06$ $C_{04}=-7.5623e-08$ $C_{05}=-1.8329e-10$ $C_{06}=-9.3466e-12$ $C_{20}=1.5416e-03$ $C_{21}=-4.0469e-07$ $C_{22}=1.5085e-07$ $C_{23}=-8.7666e-10$ $C_{24}=-1.3156e-14$ $C_{40}=3.4146e-08$ $C_{41}=1.1840e-12$ $C_{42}=3.9721e-12$ $C_{60}=-7.1066e-12$ surface R3

$C_{02}=1.8933e-03$ $C_{03}=-8.4667e-06$ $C_{04}=-9.6183e-08$ $C_{05}=4.5947e-11$ $C_{06}=-2.1682e-11$ $C_{20}=2.2505e-03$ $C_{21}=4.9289e-07$ $C_{22}=1.0880e-07$ $C_{23}=-1.2602e-09$ $C_{24}=9.2162e-12$ $C_{40}=-1.2151e-08$ $C_{41}=3.2535e-10$ $C_{42}=2.0246e-12$ $C_{60}=-7.6249e-12$ surface R5

$C_{02}=6.9371e-03$ $C_{03}=-2.0976e-04$ $C_{04}=2.2162e-06$ $C_{05}=-2.4220e-08$ $C_{06}=8.0368e-10$ $C_{20}=-1.7120e-03$ $C_{21}=-1.5612e-05$ $C_{22}=-5.7870e-08$ $C_{23}=1.7639e-08$ $C_{24}=-5.3901e-10$ $C_{40}=-9.6716e-08$ $C_{41}=3.3192e-09$ $C_{42}=-1.6123e-10$ $C_{60}=-1.6803e-12$ surface R6

$C_{02}=5.3043e-03$ $C_{03}=-2.9534e-05$ $C_{04}=-1.7392e-07$ $C_{05}=-9.4337e-09$ $C_{06}=-7.7157e-11$ $C_{20}=-2.0619e-05$ $C_{21}=-1.3461e-06$ $C_{22}=-1.7288e-07$ $C_{23}=-2.3419e-09$ $C_{24}=-4.0562e-11$ $C_{40}=-2.2836e-07$ $C_{41}=2.0954e-09$ $C_{42}=-5.0235e-11$ $C_{60}=-1.8984e-11$

EMBODIMENT 3

Figure 5:
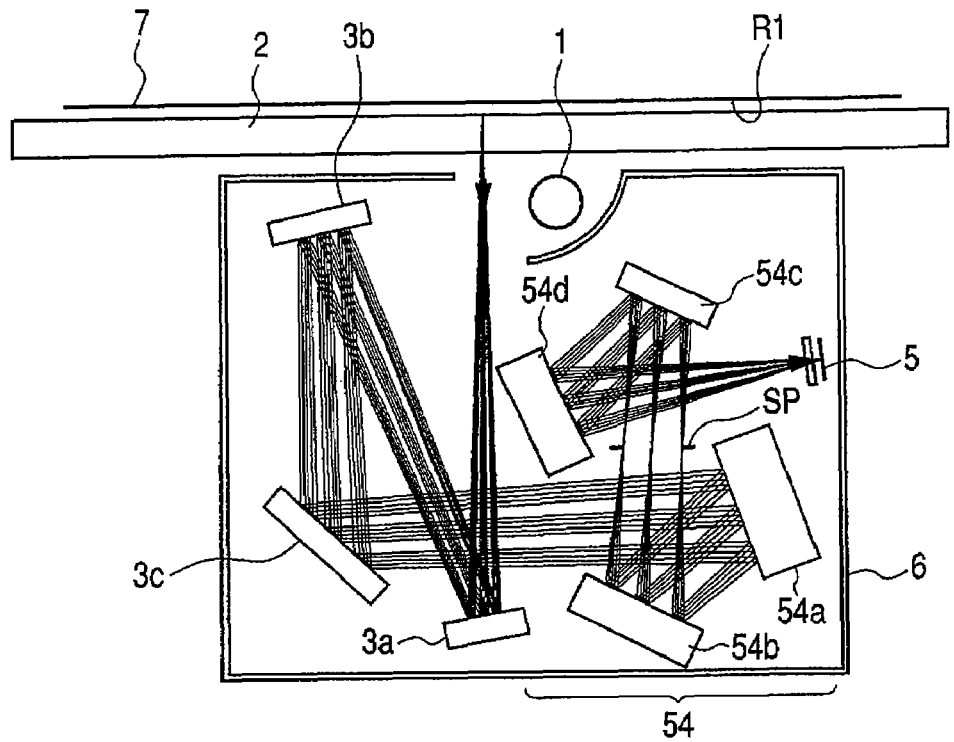
FIG. 5 is a schematic view showing a principal part of an image reading apparatus according to Embodiment 3 of the present invention.
Figure 6:
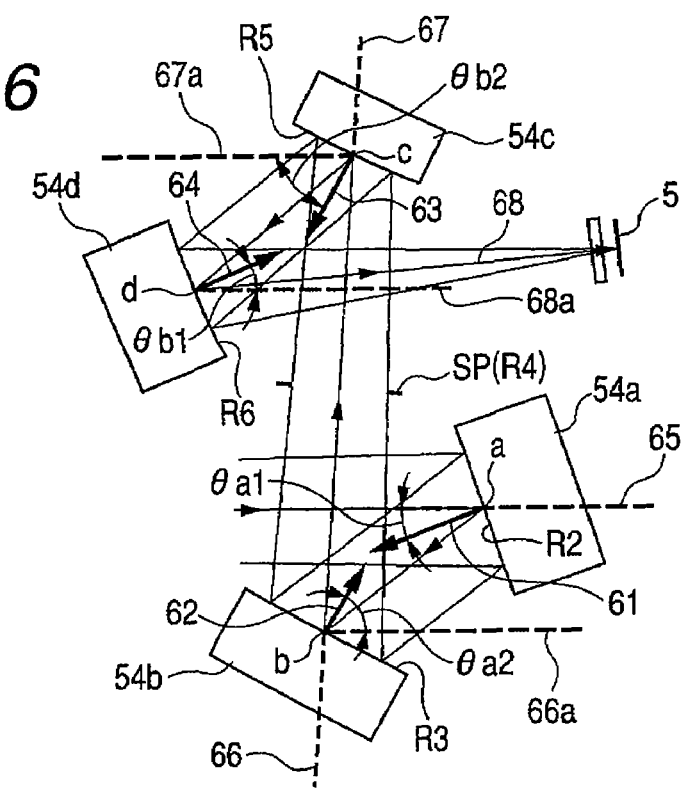
FIG. 6 is a sectional view showing an imaging optical system according to Embodiment 3 of the present invention.
Figure 7:
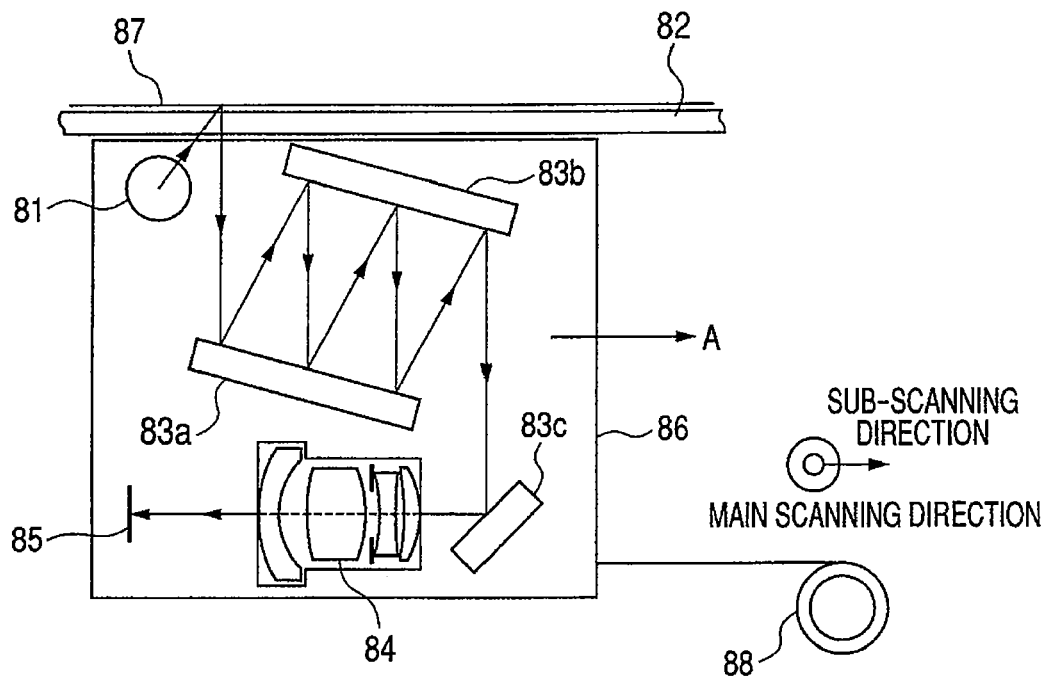
FIG. 7 is a schematic view showing a principal part of a conventional image reading apparatus.
Figure 8:
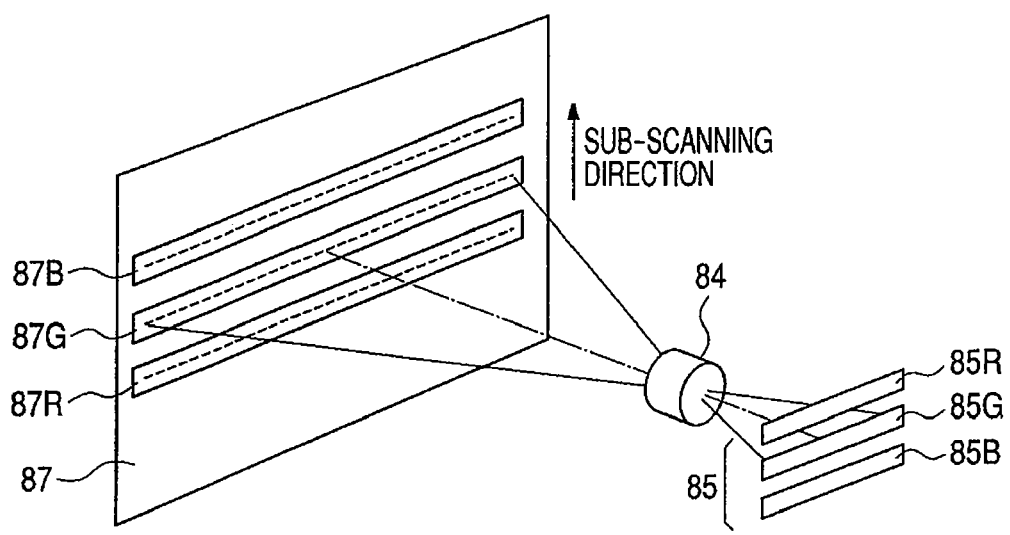
FIG. 8 is a fundamental structural view showing a color image reading apparatus.

FIG. 5 is a schematic sub-scanning sectional view showing a principal part of an image reading apparatus to which an imaging optical system according to Embodiment 3 of the present invention is applied. FIG. 6 is a schematic sub-scanning sectional view in the case where the imaging optical system 54 shown in FIG. 5 is extracted.

A point in this embodiment which is different from Embodiment 1 described earlier is that an imaging optical system 54 includes first, second, third, and fourth off-axial optical elements 54a, 54b, 54c, and 54d. Other structures and optical functions are identical to those in Embodiment 1 and thus the same effect is obtained.

That is, in FIG. 5, a light beam based on image information of an original 57 is imaged on a line sensor 35 serving as a reading means by the imaging optical system (off-axial optical system) 54 for image reading.

In this embodiment, the imaging optical system 54 includes the first, second, third, and fourth reflection type off-axial optical elements 54a, 54b, 54c, and 54d which are disposed in order from the original 7 side, each of which is made of a resin material. In order to satisfy the conditional expression (1), the first and fourth off-axial optical elements 54a and 54d are disposed such that the mirror surfaces (off-axial reflective surfaces) R2 and R6 thereof are opposed to each other and the second and third off-axial optical elements 54b and 54c are disposed such that the mirror surfaces R3 and R5 thereof are opposed to each other. Each of the first, second, third, and fourth off-axial optical elements 54a, 54b, 54c, and 54d is formed such that the length thereof in the thickness direction becomes shorter than the short-side directional length thereof.

In this embodiment, the original (object) 7 placed on the original table glass 2 is illuminated with a light beam emitted from the light source 1. A light beam reflected on the original 7 travels through the first, second, and third reflecting mirrors 3a, 3b, and 3c. Then, the light beam is imaged on the line sensor 5 by the imaging optical system 54. At this time, the original 7 and the carriage 6 are moved relative to each other in the sub-scanning direction (direction indicated by an arrow A) to two-dimensionally read the original 7.

In order to make the image reading apparatus compact, an optical path of the light beam is folded using the first, second, and third reflecting mirrors 3a, 3b, and 3c. The imaging optical system 54 is used to fold the optical path. The optical path is folded substantially in the form of a combination of two shapes of FIG. 4 by the imaging optical system 54 to facilitate the canceling of decentering caused in the opposed off-axial reflective surfaces. Therefore, preferable imaging performance is obtained.

In order to obtain more preferable imaging performance, each of the off-axial reflective surfaces are formed to be a free surface which is symmetrical with respect to the reference axis in the main scanning direction and asymmetrical with respect to the reference axis in the sub-scanning direction. Therefore, the decentering caused by folding the optical path in the sub-scanning direction is preferably corrected.

As shown in FIG. 6, an incident reference axis light beam 65 incident on the first off-axial optical element 54a is extended for the purpose of simplification. A reference axis light beam 66 exited from the second off-axial optical element 54b is extended for the purpose of simplification. A reference axis light beam 67 is incident on the third off-axial optical element 54c. A reference axis light beam 68 is exited from on the fourth off-axial optical element 54d.

An axis 66a is parallel to the optical path of the incident reference axis light beam 65 at a reflection point "b" of the mirror surface R3 on which the reference axis light beam is reflected. An axis 67a is parallel to the optical path of the incident reference axis light beam 65 at a reflection point "c" of the mirror surface R5 on which the reference axis light beam is reflected. An axis 68a is parallel to the optical path of the incident reference axis light beam 65 at a reflection point "d" of the mirror surface R6 on which the reference axis light beam is reflected.

Reference numeral 61 denotes a surface normal to the mirror surface R2 of the first off-axial optical element 54a at a reflection point "a" on which the incident reference axis light beam 65 is reflected. Reference numeral 62 denotes a surface normal to the mirror surface R3 of the second off-axial optical element 54b at a reflection point "b" on which the reference axis light beam 66 is reflected. Reference numeral 63 denotes a surface normal to the mirror surface R5 of the third off-axial optical element 54c at a reflection point "c" on which the reference axis light beam 67 is reflected. Reference numeral 64 denotes a surface normal to the mirror surface R6 of the fourth off-axial optical element 54d at a reflection point "d" on which the reference axis light beam 68 is reflected.

Reference symbol $\theta a1$ denotes an absolute value of an angle formed between the surface normal 61 and the optical path of the incident reference axis light beam 65. Reference symbol $\theta a2$ denotes an absolute value of an angle formed between the surface normal 62 and the axis 66a. Reference symbol $\theta b2$ denotes an absolute value of an angle formed between the surface normal 63 and the axis 67a. Reference symbol $\theta b1$ denotes an absolute value of an angle formed between the surface normal 64 and the axis 68a.

In this embodiment, the gravity acts in the downward direction of FIG. 6.

In this embodiment, the absolute values $\theta a1$, $\theta b1$, $\theta a2$, and $\theta b2$ of the respective angles are set so as to satisfy the conditional expression (1).

That is, in this embodiment, the absolute values $\theta a1$ and $\theta b1$ of the angles with respect to the first and fourth off-axial optical elements 54a and 54d disposed such that the mirror surfaces R2 and R6 thereof are opposed to each other are set as follows.

$$\theta a1=18.5°, \theta b1=22.425°$$

In addition, the absolute values $\theta a2$ and $\theta b2$ of the angles with respect to the second and third off-axial optical elements 54b and 54c disposed such that the mirror surfaces R3 and R5 thereof are opposed to each other are set as follows.

$$\theta a2=61.411°, \theta b2=62.837°$$

Therefore, the followings are obtained.

$$\theta a1-\theta b1=-3.92°, \theta a2-\theta b2=-1.4260$$

Each of the values satisfies the conditional expression (1).

In this embodiment, when the lengths of the first and fourth off-axial optical elements 54a and 54d in the thickness direction are expressed by Lz1 and Lz4, each of Lz1 and Lz4 is set to 6 mm. When the length of the second off-axial optical element 54b in the thickness direction is expressed by Lz2, Lz2 is set to 5 mm. When the length of the third off-axial optical element 54c in the thickness direction is expressed by Lz3, Lz3 is set to 4 mm. A margin between an effective portion and an outer periphery, which is 1 mm, is added to a length of an effective light beam area in the short-side direction at both sides thereof. When the lengths of the first, second, third, and fourth off-axial optical elements 54a, 54b, 54c, and 54d in the short-side direction are expressed in order by Ly1, Ly2, Ly3, and Ly4, Ly1, Ly2, Ly3, and Ly4 are set as follows.

$$Ly1=14, Ly2=12$$

$$Ly3=9, Ly4=11$$

Therefore, the followings are obtained.

$$Ly1/Lz1=2.3, Ly2/Lz2=2.4$$

$$Ly3/Lz3=2.25, Ly4/Lz4=1.8$$

Each of the values satisfies the conditional expression (2).

In this embodiment, the aperture stop SP (R4) is provided on an optical path between the second and third off-axial optical elements 54b and 54c, thereby reducing a size of the off-axial reflective surface.

Numerical data in Numerical embodiment 3 of the imaging optical system for image reading, which corresponds to Embodiment 3 of the present invention as described above are shown below.

Numerical Embodiment 3:
  Original read width=304.8
  Imaging magnification=−0.22028
  Element thickness: Lz1=6, Lz2=5, Lz3=4, Lz4=6
  Original side NA=0.02
  $f_{eq}$=49.912

TABLE 3

| i | Yi | Zi | θi | Ndi | Ly | |
|---|------|----------|---------|-----|----|---|
| 1 | 0.0 | 0.0 | 0.0 | 1.0 | | Object plane (original surface) |
| 2 | 0.0 | 176.6883 | 18.5 | 1.0 | 14 | Reflective plane |
| 3 | −8.2419 | 165.7509 | 61.4113 | 1.0 | 12 | Reflective plane |

TABLE 3-continued

| i | Yi | Zi | θi | Ndi | | Ly |
|---|----|----|----|-----|---|----|
| 4 | 8.2154 | 166.9530 | 85.8225 | 1.0 | | Transmission plane (aperture stop) |
| 5 | 24.1746 | 168.1186 | 62.8366 | 1.0 | 9 | Reflective plane |
| 6 | 14.9929 | 157.1182 | 22.4254 | 1.0 | 11 | Reflective plane |
| 7 | 17.5197 | 186.0000 | 5.0 | | | Imaging plane | surface R2

$C02=-1.3207E-03$ $C03=2.6667E-06$ $C04=3.3489E-06$ $C05=5.3173E-06$ $C06=-1.3333E-08$ $C07=-2.6007E-09$ $C08=-2.5014E-10$ $C20=-1.1446E-03$ $C21=-5.7000E-05$ $C22=1.6118E-06$ $C23=-7.1879E-08$ $C24=2.1492E-09$ $C25=1.2028E-10$ $C26=5.8979E-11$ $C40=-1.0980E-07$ $C41=2.3051E-08$ $C42=-9.6151E-10$ $C43=4.6901E-11$ $C44=-6.7039E-12$ $C60=4.8532E-11$ $C61=-8.2096E-12$ $C62=5.1746E-13$ $C80=-2.4227E-15$ surface R3

$C02=2.3797E-03$ $C03=-2.8576E-06$ $C04=3.6486E-06$ $C05=9.9884E-08$ $C06=-2.0000E-08$ $C07=-3.5678E-09$ $C08=-1.8740E-10$ $C20=1.2266E-03$ $C21=-7.3777E-05$ $C22=-1.6000E-07$ $C23=-2.6667E-08$ $C24=2.1607E-09$ $C25=-2.0065E-10$ $C26=1.0043E-10$ $C40=-8.0582E-07$ $C41=4.0054E-08$ $C42=2.0023E-09$ $C43=1.2699E-10$ $C44=-1.2974E-11$ $C60=7.7270E-10$ $C61=-2.5130E-11$ $C62=-1.5557E-12$ $C80=-3.8483E-13$ surface R5

$C02=5.4062E-03$ $C03=5.3333E-06$ $C04=3.8756E-06$ $C05=6.9415E-07$ $C06=2.0000E-07$ $C07=-5.4455E-08$ $C08=-6.0202E-09$ $C20=-2.6134E-03$ $C21=-1.6073E-05$ $C22=-6.1166E-06$ $C23=-3.3333E-07$ $C24=6.0000E-09$ $C25=-9.2388E-09$ $C26=-1.4212E-09$ $C40=-1.5265E-06$ $C41=-1.4026E-07$ $C42=3.1323E-09$ $C43=-1.4890E-10$ $C44=-1.9827E-12$ $C60=1.5752E-09$ $C61=4.9067E-11$ $C62=-4.1013E-12$ $C80=-9.2414E-13$ surface R6

$C02=1.0000E-02$ $C03=-1.1951E-05$ $C04=8.0000E-07$ $C05=1.2553E-07$ $C06=1.4258E-07$ $C07=-1.2965E-08$ $C08=-9.3779E-10$ $C20=4.8806E-03$ $C21=-1.3709E-05$ $C22=-2.0841E-06$ $C23=-2.7268E-07$ $C24=-1.4302E-08$ $C25=2.0567E-09$ $C26=-1.3279E-10$ $C40=-1.3224E-06$ $C41=-8.6942E-08$ $C42=-7.0696E-09$ $C43=-4.4229E-10$ $C44=2.6856E-11$ $C60=-4.1850E-10$ $C61=-6.8174E-11$ $C62=-5.1278E-12$ $C80=1.2409E-13$

This application claims priority from Japanese Patent Application No. 2005-029298 filed on Feb. 4, 2005, which is hereby incorporated by reference herein.

What is claimed is:

1. An imaging optical system for image reading, in which image information on a surface of an original is imaged on a line sensor and the image information is read by the line sensor, comprising:

a first off-axial optical element and a second off-axial optical element disposed in order from an original side, each of the first and second off-axial optical elements is a reflection type off-axial optical element having free-form surface shape and made of a resin material, wherein, letting a main scanning direction be a line direction of the line sensor and a sub-scanning direction be a direction orthogonal to the main scanning direction, a length of each of the first and second off-axial optical elements in the main scanning direction is longer than a length thereof in the sub-scanning direction and a thickness thereof is smaller than the length thereof in the sub-scanning direction, and wherein in a sub-scanning section in which the main scanning direction corresponds to a normal, the following condition is satisfied, $-30° < \theta a - \theta b < 30°$, where θa represents an absolute value of a first angle formed between a surface normal to a reflective surface of the first off-axial optical element at a reflection point of the reflective surface of the first off-axial optical element at which a reference axis light beam is reflected and a reference axis light beam incident on the reflective surface of the first off-axial optical element and θb represents an absolute value of a second angle formed between a surface normal to a reflective surface of the second off-axial optical element at a reflection point of the reflective surface of the second off-axial optical element at which the reference axis light beam is reflected and the reference axis light beam incident on the reflective surface of the first off-axial optical element.

2. An imaging optical system for image reading according to claim 1, wherein each of said off-axial optical elements comprises a reflective surface which is symmetrical with respect to a reference axis of the imaging optical system in the main scanning direction and asymmetrical with respect to the reference axis in the sub-scanning direction.

3. An imaging optical system for image reading according to claim 2, wherein said plurality of off-axial optical elements include thicknesses different from one another.

4. An imaging optical system for image reading according to claim 1, wherein said plurality of off-axial optical elements are held in a holding portion of a lens barrel and the off-axial optical elements are different from one another in a position of a portion of the off-axial optical element which abuts the holding portion of the lens barrel.

5. An imaging optical system for image reading according to claim 1, wherein the following condition is satisfied, $1.5 < Ly/Lz < 20$, where Lz represents a thickness of an arbitrary off-axial optical element of the first, second, third and fourth off-axial optical elements and Ly represents a length thereof of in the sub-scanning direction.

6. An image reading apparatus, comprising:
the imaging optical system for image reading according to claim 1;
an original table on which said original is placed; and
said line sensor.

* * * * *